United States Patent [19]
Ma

[11] Patent Number: 6,095,060
[45] Date of Patent: Aug. 1, 2000

[54] VEHICLE TRAY APPARATUS

[76] Inventor: Mark Ma, 1702 W. Thomas St., Hammond, La. 70401

[21] Appl. No.: 09/188,613

[22] Filed: Nov. 9, 1998

[51] Int. Cl.[7] .................................................. A47B 23/00
[52] U.S. Cl. ............................................... 108/45; 108/44
[58] Field of Search .................................. 108/44, 45, 46, 108/25, 26

[56] References Cited

U.S. PATENT DOCUMENTS

| | | | |
|---|---|---|---|
| 2,657,107 | 10/1953 | Bisaga et al. | 108/45 |
| 2,825,611 | 3/1958 | Aynesworth | 108/45 |
| 3,104,895 | 9/1963 | Feuerbach et al. | 108/45 X |
| 3,164,109 | 1/1965 | Atkinson | 108/44 |
| 3,785,300 | 1/1974 | Anderson | 108/44 |
| 3,899,982 | 8/1975 | Fetzek | 108/45 X |
| 5,419,265 | 5/1995 | Zimmerman | 108/45 |
| 5,542,360 | 8/1996 | Fleming | 108/44 |

FOREIGN PATENT DOCUMENTS 667409  2/1952  United Kingdom ..................... 108/45

*Primary Examiner*—Jose V. Chen
*Attorney, Agent, or Firm*—Garvey, Smith, Nehrbass & Doody, LLC

[57] ABSTRACT

A tray apparatus securable to the windshield via suction cups or the like, and for providing a second pair of suction cups which are adjustable in height to be attachable onto the dash board. There is further provided a framework which allows the tray to slide from the frame and rotate to a position below the dashboard at the level of the lap of a driver of a car. When not in use, the tray is returnable to the tray framework so that it may be stored atop the dashboard for further use. There are further included cup holders foldable out from the tray surface for supporting cups therein.

10 Claims, 3 Drawing Sheets

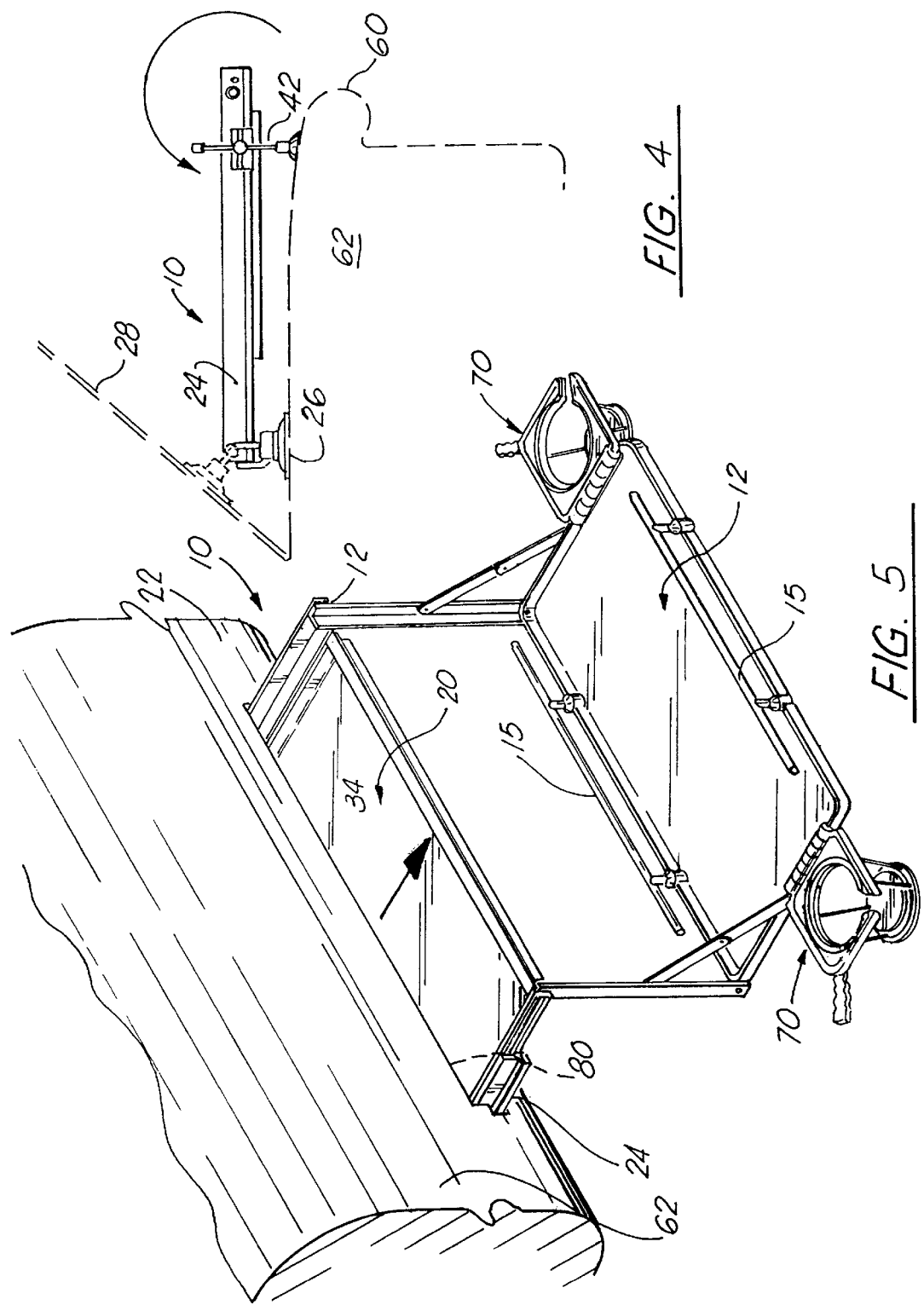

VEHICLE TRAY APPARATUS

STATEMENT REGARDING FEDERALLY SPONSORED RESEARCH OR DEVELOPMENT

Not applicable

CROSS-REFERENCE TO RELATED APPLICATIONS

Not applicable

REFERENCE TO A "MICROFICHE APPENDIX"

Not applicable

BACKGROUND OF THE INVENTION

1. Field of the Invention

The apparatus of the present invention relates to vehicles. More particularly, the present invention relates to an apparatus which is positionable on the dash board of a vehicle, and adheres to the windshield of the automobile in order to enable the driver or other passengers of the vehicle to utilize the apparatus as a serving tray so that food and drink may be supported thereupon while the vehicle is being utilized.

2. General Background of the Invention

In our mobile society today, individuals quite often are required to eat their meals, breakfast and lunch, "on the run", and within the confines of their automobile or other vehicles. For example, salesmen or other people are on the road a better part of the day, and often times do not have the time and convenience to stop in order to eat a meal, but simply eat while on the road. In fact, one of the more popular items in fast food outlets is the use of the drive through window, where people are able to pick up food, and either bring the food home, or, very often, eat while in route.

At the present time, applicant is the owner of U.S. Pat. No. 5,106,003, entitled "Vehicle Tray Table," which discloses a vehicle tray table to rest o the dashboard and adhere to the windshield with suction cups. Another embodiment folds outward from above the dashboard via a single arm member so that the tray can be stored above the windshield and can fold down to be substantially on the same plane as the dashboard. The apparatus of the present invention presents a modified and improved vehicle tray from that taught in the '003 patent, and introduces such improvements into the art.

BRIEF SUMMARY OF THE INVENTION

The apparatus of the present invention solves the problems in the art in a simple and straightforward manner. What is provided is a tray which includes a flat, horizontal surface, positioned within a frame, with the framed tray adaptable to be positioned atop the dash board of a vehicle, such as an automobile. There would be further provided a means for attaching one end of the tray to the windshield via suction cups or the like, and for providing a second pair of suction cups which are adjustable in height to be attachable onto the dash board, so that the tray would be supported flat in use. There is further included a framework for the tray, so that the framework would allow the tray to slide forward and down so that it would be positioned adjacent the driver, in front of the dashboard. There is further provided cup holders which may fold out from a first position, lying on the tray surface, to a second position, where the holders are folded outside the tray to hold a cup or the like therein.

Therefore, it is a principal object of the present invention to provide a support surface for food and soft drinks or the like within the interior of a vehicle while the vehicle is in use;

It is a further object of the present invention to provide a removable tray attachable to a vehicle and positionable onto the dash board, so that food and other materials may be placed upon the tray and consumed while the vehicle or the like is in motion;

It is still a further object of the present invention to provide a tray adaptable to the interior of a vehicle or the like which would further include means for accommodating a soft drink in a cup or bottle to avoid spillage of the drink; and It is still a further object of the present invention to provide a vehicle tray apparatus, securable atop the dashboard, within a frame; the tray slidable from the frame and foldable downward to a level below the dashboard at the driver's lap region.

These and other objects of this invention will be readily apparent to those skilled in the art from the detailed description and claims which follow.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein:

FIG. 4 illustrates the preferred embodiment of the apparatus of the present invention in the storage configuration; and FIG. 5 illustrates the preferred embodiment of the apparatus of the present invention as it would be integrated into a vehicle dashboard.

DETAILED DESCRIPTION OF THE INVENTION

Figure 1:
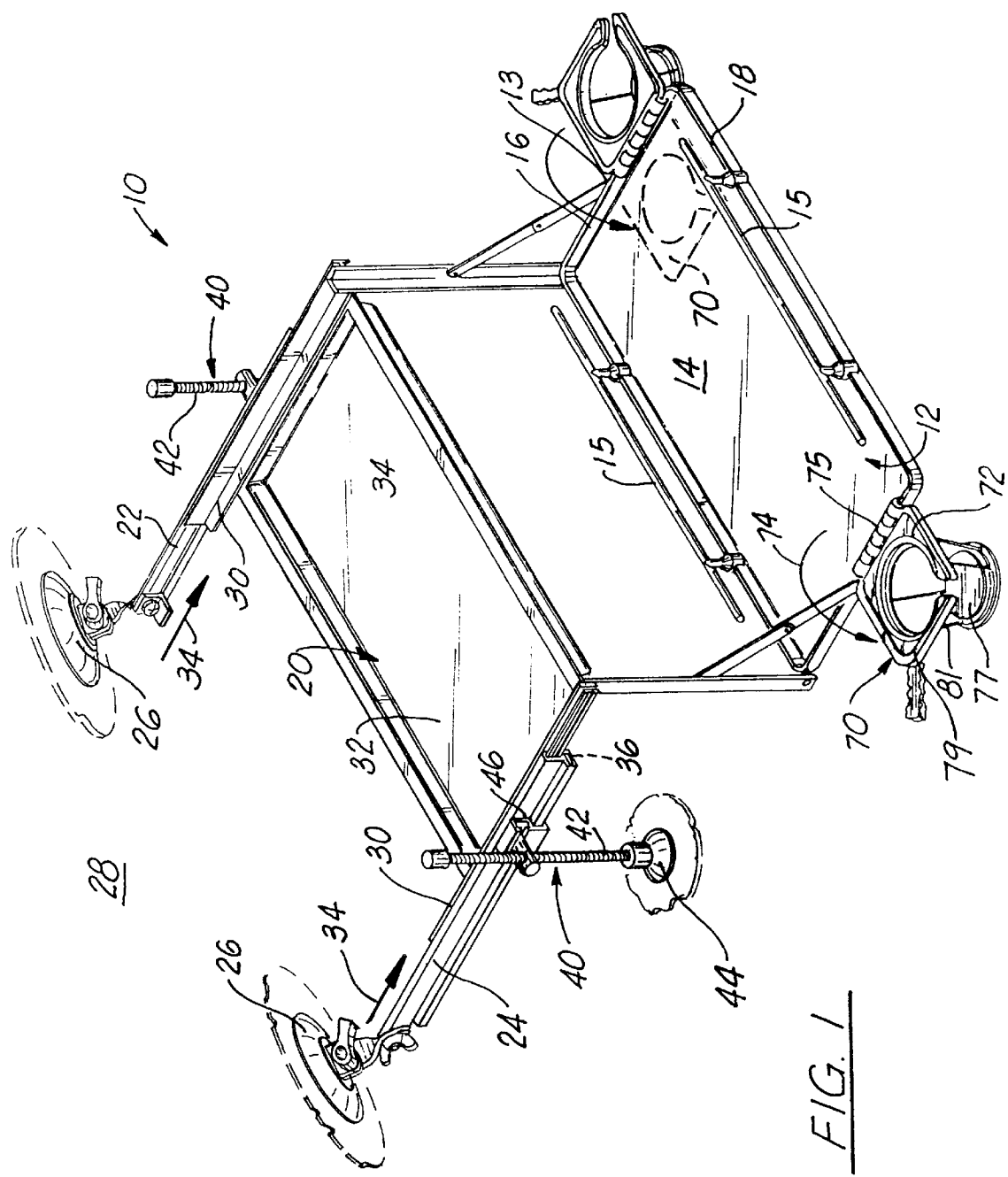
FIG. 1 illustrates an overall view of the preferred embodiment of the apparatus of the present invention.

FIGS. 1 through 5 illustrate the preferred embodiment of the apparatus of the present invention which is illustrated by the numeral 10, but which is shown in various positions within the interior of the vehicle during use. As illustrated in the overall view in FIG. 1, apparatus 10 would comprise a horizontal support tray portion 12 which would be constructed of a light-weight and rigid material so that food items or drink may be supported on the upper tray surface 14. Surface 12 would be provided with a perimeter border 16, which would be raised a distance as represented by edge 18 above surface 14, so that items placed upon surface 14 which would not have a tendency to slide off of the surface while the vehicle is in use. Perimeter border 16 would form a rectangular completely surrounding surface 14, and therefore prevent the loss of any items set thereupon. Border 16 would further include raised members 15 which would help secure items atop surface 12 thereupon during travel.

As further illustrated, apparatus 10 would further comprise a framework 20 which comprises a pair of arms 22, 24, each having a suction cup 26 on its end, each suction cup 26 securable to the windshield 28 of the automobile. The arms 22, 24 would be slidably engaged into the side edges 30 of a lower frame 32, which includes a flat base portion 34. As seen in FIG. 1, after cups 26 have been secured to windshield 28, the frame 20 would slide outward from the arms 22, 24 in the direction of arrows 34. It is noted that the side arms 22, 24 are engaged in slots 36 along the edges 30 of frame 20, allowing the frame to slide. The frame also includes a pair of height adjustment members 40, each comprising a vertical member 42, having a suction cup 44, on its lower end, to allow the front end 46 of the arms 22, 24 to be raised or lowered to the horizontal, as the members 42 are engaged, to raise or lower the surface 34 of frame 32. As seen further in FIG. 1, tray portion 12 would normally be stored within frame 32 while not in use. When placed in use, tray 12 would be rotated out of frame 32, in the direction of arrow 50, with tray portion secured to a pair of arms 52, 54 which are engaged to frame 32. As seen in FIG. 1, as the arms 52, 54 are rotated to the vertical, tray 12 would then rotate out from between arms 52, 54, in the direction of arrows 56. As seen in FIG. 1, the arms 52, 54, have been rotated to the vertical at a position directly in front of the outer edge 60 of dashboard 62, so that the lower ends of arms 52, 54, are substantially at the level of the lap of a driver of the automobile.

Figure 2:
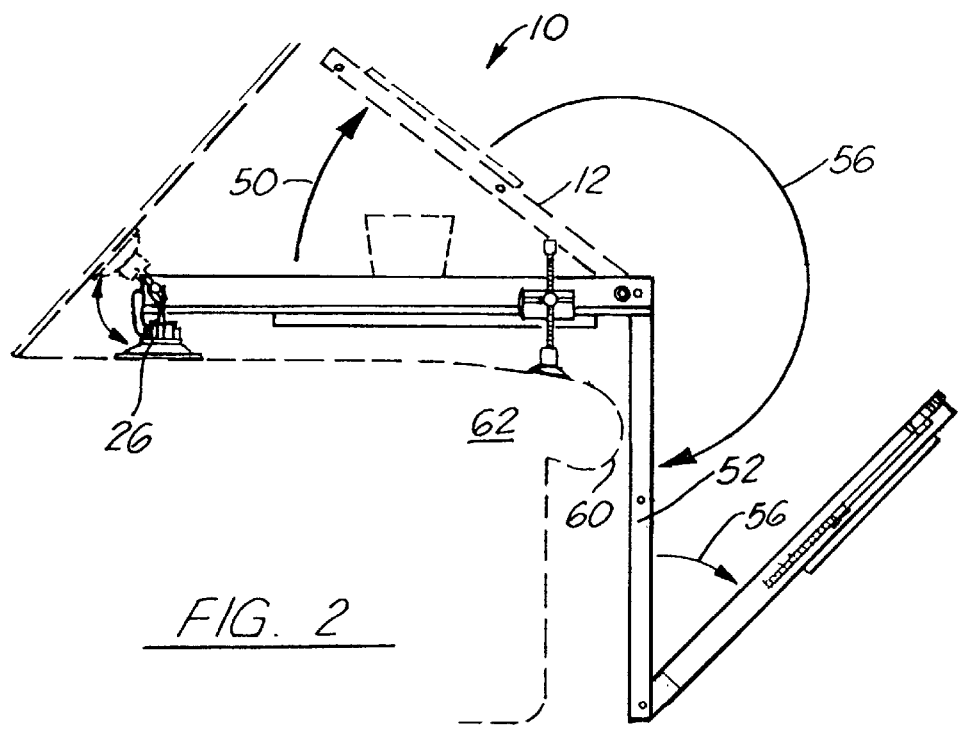
FIG. 2 illustrates a side plan view of the principal embodiment of the present invention secured atop a dashboard of an automobile.
Figure 3:
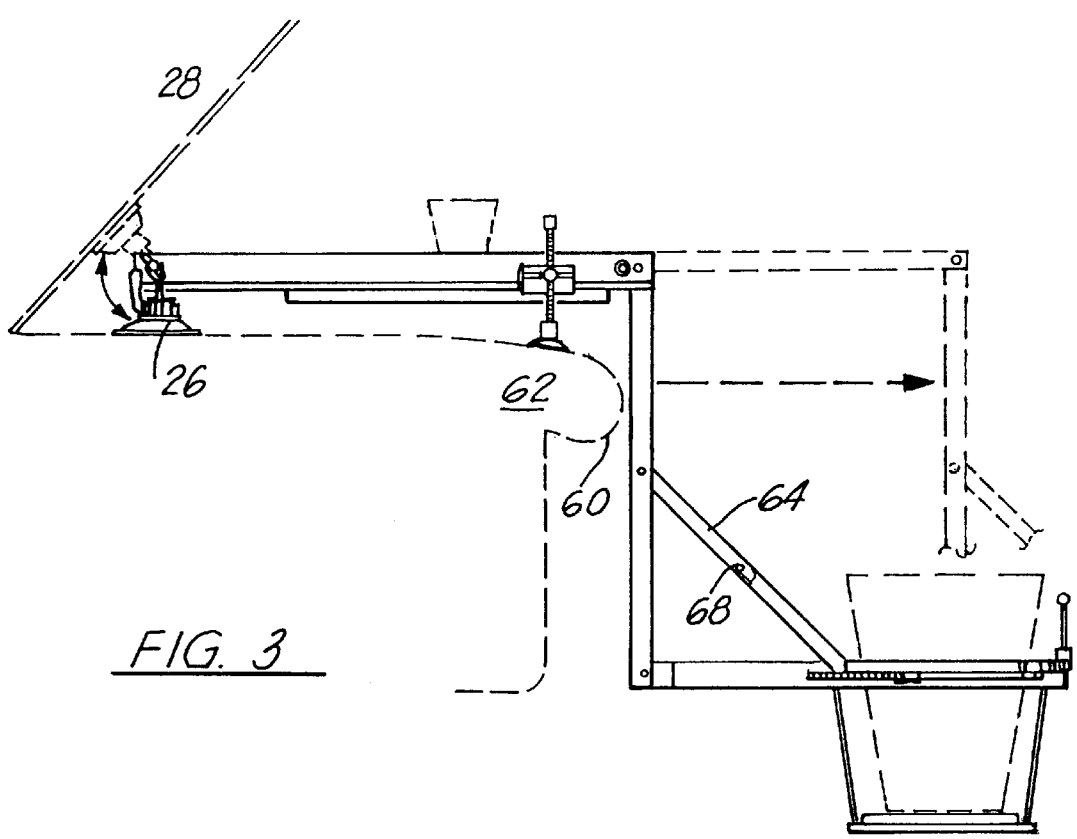
FIG. 3 illustrates the preferred embodiment of the apparatus of the present invention whereby the tray has been folded downward from the dashboard and is supporting a cup therein.

Turning now to FIG. 2, as seen, the tray 12 has been rotated down in the direction of arrows 56, to the horizontal, held in place by a pair of support members 64, 66, extending from the tray 12 at a diagonal to substantially the center point of vertical arms 52, 54. As seen, member 64, 66 have the ability to fold at their center hinge point 68, when the tray is stored within the framework as discussed earlier. As seen further in FIG. 3, there is further included in the combination, a pair of cup holders 70, each cup holder 70 normally folded and lying on the upper surface of tray 12, as seen in phantom view in FIG. 3. Upon placing tray 12 in the user position as seen in FIGS. 2 and 3, cup holders 70 are then flipped in the direction of arrow 74, so that they are supported on the outside of tray 12 along the edge 13 of the tray 12 via a hinge member 75. The holders 70 have a base portion 77, secured to an upper member 79 by a plurality of support arms 81. When stored as seen in phantom view, the base 77 rests flush with the upper member 79 on tray 12, for compact storage.

When the tray 12 is no longer in use, as seen in FIG. 4, the cup holders 70 are folded to rest on the surface of tray 12; tray 12 is folded to a position between arms 52, 54, and then, arms 52, 54, with tray 12 therebetween are folded upward to rest against the framework 20. The framework 20 is then slid rearward along arms 22, 24, to a position, resting on the dashboard of the automobile, and against the windshield as illustrated in FIG. 1. In this manner, the apparatus 10 may be maintained on the dashboard at all times, and simply folded into use and refolded for storage.

FIG. 4 illustrates the apparatus 10 configured in the storage position atop the dashboard 62, secured to windshield 28. The tray 12 would be secured flush against the framework 20, with the cup holders 70 lying substantially flush between the framework 20 and tray 12, to configure a flat, compact storage unit resting on dashboard 62, when not in use.

In FIG. 5, the apparatus 10, rather than resting on dashboard 62, in the storage mode, would be accommodated in a pocket or storage area 80 within the dashboard 62, so that the apparatus would be pulled from the dashboard, with the ends of legs 22, 24 secured within the storage area 80, allowing the tray 12 and framework 20 to extend out from dashboard 62. Once the end of the tray 12 has cleared the dashboard, the tray 12 could then fold from framework 20, similar to the manner shown in FIGS. 2 and 3, to define the tray assembly as seen in FIG. 3. The only difference is that the apparatus, when stored away, would not rest on dashboard 62, but would be incorporated therein.

The foregoing embodiments are presented by way of example only; the scope of the present invention is to be limited only by the following claims.

What is claimed is:

1. An apparatus in combination with a dashboard of a vehicle for supporting food items in the interior of a vehicle, the combination comprising:
    a) a substantially flat tray portion, including a raised perimeter there around;
    b) suction means attached to at least a front edge of the tray portion for suctioningly engaging an interior surface of the vehicle windshield;
    c) a second pair of members attached to the tray portion for engaging the upper surface of the automobile dash board, so that the tray is maintained in a fixed and horizontal position;
    d) a framework, allowing the tray portion, to fold from a first storage position within the framework on the dashboard, to a second position in front of the dashboard, and to be returned to the storage position when not in use;
    e) a pair of vertically aligned members slidably engaged on the tray portion for allowing the tray portion to be height adjustable from the dashboard.

2. The apparatus of claim 1, wherein the suction means further includes a pair of suction cups attached to arms slidable secured to the framework on their first end and pressed against the interior surface of the windshield on their second end.

3. The apparatus of claim 1, further comprising a cup holder secured to the edge of the tray, and foldable outward, so that a base provides a means for allowing a cup to be secured within the cup holder, and returnable to rest on the tray surface when not in use.

4. The apparatus in claim 1, further comprising a pair of cupholders, rotatably from a first storage position on the tray surface to a second position, extending outward from the tray surface for supporting a cup therein.

5. An apparatus in combination with a dashboard of a vehicle for supporting materials on the dashboard within the interior of the vehicle, the combination comprising:
    a) a pair of arms secured to the windshield via suction cups on a first end;
    b) a tray framework, slidably moveable along the length of the arms;
    c) a tray portion, secured within the framework, the tray portion, rotatable out of the tray portion;
    d) a second pair of arms securing the tray to the tray framework, so that when the tray is rotated out of the tray framework, the tray is resting in a horizontal position in front of the dashboard substantially above the seat of the vehicle;
    e) a pair of vertically aligned members slidably engaged on the tray portion for allowing the tray portion to be height adjustable from the dashboard; and
    f) at least one cup holder secured to the edge of the tray, and foldable outward, including a slidable base for allowing a cup to be secured within the cup holder resting on the base, and returnable to rest on the tray surface when not in use.

6. The apparatus in claim 5, further comprising hinged support arms supporting the tray in the horizontal position extending from the second pair of arms.

7. The apparatus in claim 5 wherein the tray surface includes a border there around.

8. The apparatus in claim 5 wherein the tray surface may be returned to its storage position within the tray framework.

9. The apparatus in claim 5, wherein the apparatus may be stored on the dashboard when not in use.

10. An apparatus in combination with a dashboard of a vehicle for supporting food items in the interior of the vehicle, the apparatus comprising:
   a) a substantially flat tray portion, including a raised perimeter there around;
   b) a framework secured to the dashboard, and slidably moveable therefrom, for allowing the tray portion, to fold from a first storage position within the framework, to a second position in front of the dashboard, the framework defining an upper horizontal surface for placing items in addition to the lower tray surface;
   c) a pair of vertically aligned members slidably engaged on the tray portion for allowing the tray portion to be height adjustable from the dashboard; and
   d) means for allowing the framework, including the tray portion when in a storage position within the framework, to be slidably returned within an opening formed in the dashboard, so that the apparatus is stored therein when not in use.

* * * * *